United States Patent [19]

Marshall, Jr.

[11] 4,268,091
[45] May 19, 1981

[54] WHEEL TRIM ASSEMBLY

[75] Inventor: Claude J. Marshall, Jr., Ann Arbor, Mich.

[73] Assignee: Rockwell International Corporation, Pittsburgh, Pa.

[21] Appl. No.: 65,632

[22] Filed: Aug. 10, 1979

[51] Int. Cl.³ .............................................. B60B 7/00
[52] U.S. Cl. .................................. 301/37 R; 24/295; 301/108 R
[58] Field of Search .............. 301/27 R, 37 P, 37 CD, 301/37 TP, 37 PB, 37 B, 108 R, 108 A; 24/73 HC, 73 B

[56] References Cited

U.S. PATENT DOCUMENTS

| | | | |
|---|---|---|---|
| 2,729,508 | 1/1956 | Lyon | 301/37 R |
| 2,993,720 | 7/1961 | Russell | 301/108 R |
| 3,970,346 | 7/1976 | Kretschmer | 301/37 P |

FOREIGN PATENT DOCUMENTS 166589 12/1953 Australia ...................... 301/37 CD Primary Examiner—H. Grant Skaggs

[57] ABSTRACT

A wheel trim assembly for disposition on the axial outer face of a vehicle has a wheel flange. The wheel trim assembly is of the type comprising an annular ring having a rim portion disposed on a plane substantially parallel to the plane of said wheel flange. The rim portion has formed on its outer surface a plurality of receptacles each of which slidably receive a spring retention clip for mechanically interlocking the spring retention clip to the annular ring. The spring retention clip is engageable with the wheel flange for mounting the wheel trim assembly on the wheel. The receptacle includes two opposed radially inwardly facing tabs and an axial inwardly facing stop tab all formed by upsetting the tab material from the annular ring. The spring retention clip has an arcuate base portion whose arc corresponds generally to the arc of the outer surface of the annular ring. The base portion of the spring retention clip is received by the receptacle such that each end thereof is captured and guided by the tabs. The stop tab captures the base portion of the spring retention clip along the bottom edge thereof.

10 Claims, 8 Drawing Figures

U.S. Patent  May 19, 1981  4,268,091
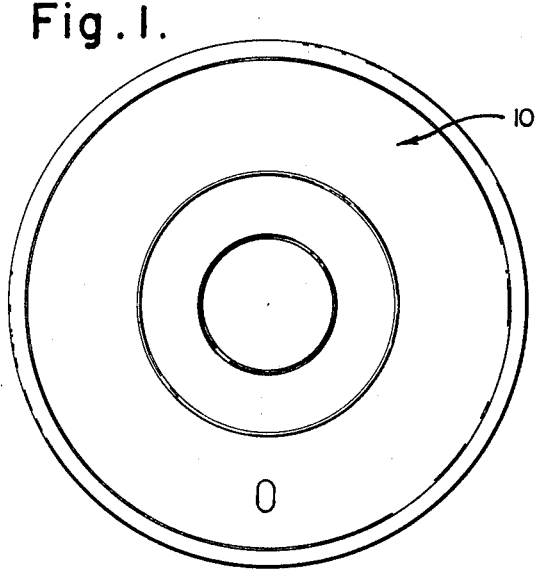
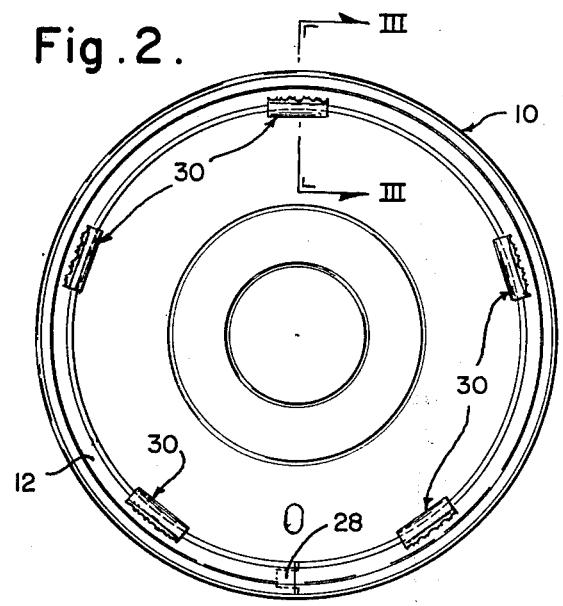
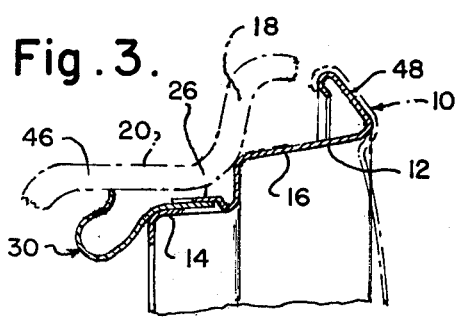
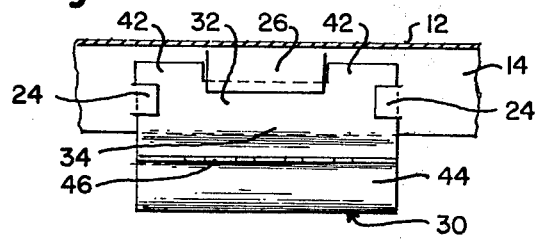
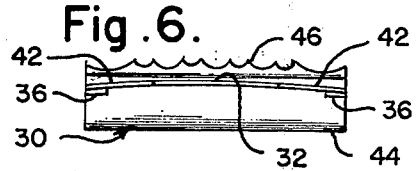
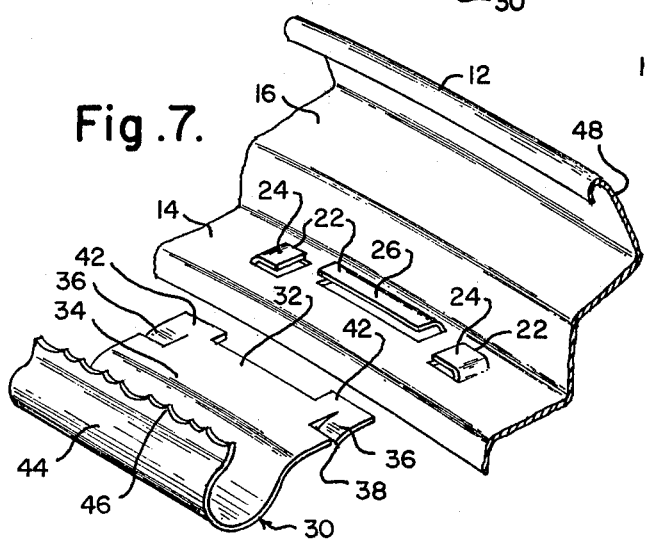
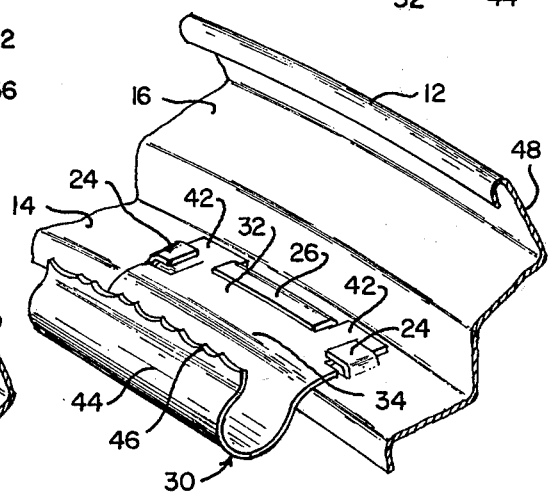

WHEEL TRIM ASSEMBLY

BACKGROUND OF THE INVENTION

1. Field of the Invention

The present invention relates generally to vehicle wheel trim assemblies and, more particularly, to trim rings and wheel covers. Within this field of invention, the present invention, more particularly, relates to improvements in securing spring retention clips to such wheel trim assemblies.

2. Description of the Prior Art

Many problems have been encountered with trim rings and wheel covers and their attachment to vehicle wheels. The operative part that places the primary role in effecting this attachment to the vehicle wheel is the spring retention clips which must, on one hand, be of resilient material and, on the other hand, must be incorporated and integrated into the manufacturing of the trim ring or wheel cover, as the case may be, without undue expense or complication. In the past, the spring retention clips were formed of the same material as the trim ring and wheel cover which, in many cases, was stainless steel. This resulted in substantial waste of material as well as a relatively inferior spring retenion clip.

With this problem in mind, many prior art patents sought to resolve the basic problem with spring retention clips by providing multi component wheel trim assemblies. Typical examples of these prior art wheel trim assemblies are as follows:

| U.S. Pat. Nos. | | |
|---|---|---|
| | 1,945,348 | 3,043,632 |
| | 2,304,583 | 3,071,416 |
| | 2,410,174 | 3,168,349 |
| | 2,431,338 | 3,425,747 |
| | 2,493,001 | 3,703,318 |
| | 2,544,705 | 3,746,397 |
| | 2,581,424 | 3,757,400 |
| | 2,581,425 | 3,771,834 |
| | 2,713,517 | 3,794,385 |
| | 2,714,041 | 3,868,147 |
| | 2,827,332 | 3,973,801 |
| | 2,828,160 | 4,131,322 |
| | 2,939,744 | |

None of these patents have achieved a highly reliable multi component wheel trim assembly which results in a highly effective and resilient spring retention clip which is inexpensive to manufacture and can be effectively and efficiently integrated with the high volume manufacturing techniques employed in manufacturing products of this type.

SUMMARY OF THE INVENTION

The primary object of this invention is to provide a wheel trim assembly for disposition on the axial outer face of a vehicle wheel having a wheel flange. The wheel trim assembly is of the type comprising an annular ring having a rim portion disposed in a plane substantially parallel to the plane of the wheel flange. The rim portion has formed on the outer surface thereof a plurality of receptacles each of which slidably receive a spring retention clip for mechanically interlocking the spring retention clip to the annular ring. The spring retention clip is engageable with the wheel flange for mounting the wheel trim assembly on the wheel. The receptacle includes two opposed radially inwardly facing tabs and an axial inwardly facing stop tab all formed by upsetting the tab material from the annular ring. The spring retention clip has an arcuate base portion whose arc corresponds generally to the arc of the outer surface of the annular ring. The base portion of the spring retention clip is received by the receptacle such that each end thereof is captured and guided by the tabs. The stop tab captures the base portion of the spring retention clip along the bottom edge thereof.

Another object of the present invention is to provide a wheel trim assembly wherein the inwardly facing stop tab is located centrally between the tabs and there are at least three receptacles each receiving a spring retention clip.

Still another object of the present invention is to provide a wheel trim assembly wherein the spring retention clip is further provided with a semi-circular top portion terminating in a reverse turned toothed portion frictionally engaging the wheel flange.

A further object of the present invention is to provide a wheel trim assembly wherein the spring retention clip is provided with at least one locking tab formed on the base portion for registration with the opening in the rim portion caused by the upsetting of the tab to therefore mechanically interlock the spring retention clip to the annular ring at the rim portion.

Another object of the present invention is to provide a wheel trim assembly wherein there are two locking tabs, one provided at each end of the base portion of the spring retention clip.

Still another object of the present invention is to provide a wheel trim assembly wherein the spring retention clip is manufactured from spring steel and wherein the semi-circular top portion of the spring retention clip provides substantial biasing force to frictionally engage the toothed portion with the wheel flange.

A further object of the present invention is to provide a wheel trim assembly wherein the annular ring is manufactured from galvanized strip steel formed in a closed loop.

Still a further object of the present invention is to provide a wheel trim assembly wherein the annular rim has formed thereon a radially projecting lip, an annular ornamental cover being mechanically interlocked to the annular ring by the deforming of the annular ornamental cover about the radially projecting lip.

Another object of the present invention is to provide a wheel trim assembly wherein the annular ornamental cover is a wheel cover and trim ring.

Still another object of the present invention is to provide a wheel trim assembly wherein the base portion of the spring retention clip is provided with two axially projecting legs, the inner surfaces of which engage and extend beyond the locking tab.

A further object of the present invention is to provide a wheel trim assembly wherein the annular ring is formed by welding each end of the looped galvanized steel to each other.

Another object of the present invention is to provide a wheel trim assembly wherein there are five receptacles, each receiving one spring retention clip.

Still another object of the present invention is to provide a wheel trim assembly wherein the rim portion of the annular ring is disposed slightly angularly inwardly with respect to the plane of the wheel flange.

A further object of the present invention is to provide an improved vehicle wheel trim assembly which is relatively simple and inexpensive to manufacture and may be easily mounted on or removed from a vehicle wheel and assures strong and reliable retention.

Another object of the present invention is to provide a vehicle trim ring assembly which is quickly and easily assembled without requiring the riveting or welding of the spring retention clips to the vehicle wheel trim assembly.

A further object of the present invention is to provide a retainer of this character which is of lightweight material and manufactured from essentially inexpensive materials.

These and other objects, features and advantages of the present invention will become apparent from the following specification, claims and drawings.

BRIEF DESCRIPTION OF THE DRAWINGS

FIG. 1 is a plan view of the front of the wheel trim assembly in accordance with the present invention.

FIG. 2 is a rear view of the wheel trim assembly of FIG. 1.

FIG. 3 is a partial sectional view taken along the line III—III in FIG. 2.

FIG. 4 is an enlarged fragmentary view of the spring retention clip of the wheel trim assembly of FIG. 2.

FIG. 5 is a side view of the spring retention clip.

FIG. 6 is a top view of the spring retention clip of FIG. 5.

FIG. 7 is a partial perspective view of the spring retention clip to be assembled with the wheel flange.

FIG. 8 shows the spring retention clip engaged with the wheel flange of the wheel trim assembly of FIG. 2.

Referring now to the drawings, there is shown a wheel trim assembly 10 embodying concepts of the present invention. The wheel trim assembly 10 comprises a multiplicity of parts which will be discussed further below and this multiplicity of parts will enable the manufacture of the wheel trim assembly 10 using high volume manufacturing techniques. The wheel trim assembly 10 is provided with an annular ring 12 having several rim portions including first rim portion 14 and second rim portion 16. The rim portions 14 and 16 provide, among other things, structural integrity to the overall wheel trim assembly 10. As can be seen from the drawings, the planes of the rim portions 14 and 16 are substantially parallel to the central axis of the wheel trim assembly 10. Further, as before mentioned, the wheel trim assembly 10 is adapted for assembly on the axial outer face of the vehicle wheel 18 and, accordingly, the rim portions 14 and 16 will be generally parallel to the axial plane of the wheel flange 20. On further inspection, it can be seen that the first rim portion 14 is disposed slightly angularly inwardly with respect to the plane of the wheel flange 20.

The first rim portion 14 of the annular ring 12 has provided thereon a series of receptacles 22 and such receptacles 22 are disposed around the outer circumference of the first rim portion 14. The receptacles 22 are formed from the material of the annular ring 12 and, more particularly, the first rim portion 14 thereof. This would be accomplished by using suitable dies to upset the various components comprising the receptacles 22. More particularly, the firt rim portion 14 has formed therefrom two opposed circumferentially facing tabs 24. In addition to the tabs 24, there is also formed from the material of the first rim portion 14 an axially, inwardly facing stop tab 26. A material that is particularly suited for the manufacture of the annular ring 12 including the first rim portion 14 at the same time affording the necessary structural integrity to the wheel trim assembly 10 is galvanized steel, ASTM A525, which may be of the type G115 and may have a gauge of approximately 0.22 (0.0299 inches). The utilization of galvanized steel reduces the cost of the material yet at the same time provides for the necessary performance and manufacturing characteristics particularly suitable for the manufacture of the wheel trim assembly 10. It may also be added that the annular ring 12 may be formed from a single strip of such galvanized steel and may be formed in a closed loop, the end 28 of which could be interlocked or fastened to each other by suitable means such as spot welding or the like.

Referring again to the receptacles 22, they are particularly adapted to slidably receive a spring retention clip 30. The spring retention clip 30 is provided with two basic portions; a base portion 32 and a top portion 34. As can be seen, the base portion 32 is formed in an arc which generally corresponds to the arc defined by the outer surface of the annular ring 12 and, more particularly, the first rim portion 14 thereof. The spring retention clip 30 is mechanically interlocked to the first rim portion 14 by slidably inserting the spring retention clip 30 into the receptacles 22. As the spring retention clip 30 is so inserted into the receptacles 22, the tabs 24 will capture and guide the spring retention clip 30 into the receptacle 22. As the spring retention clip 30 is fully inserted with the receptacle 22, the base portion will be further captured by the stop tab 26 and ultimately the base portion 32 will butt up against and be stopped by the stop tab 26. The spring retention clip 30 is further provided with at least one locking tab 36 and, as shown in the drawings, there are two such locking tabs 36, one provided on each side of the spring retention clip 30. The locking tabs 36 are formed by the deformation of the spring retention clip 30 and are upwardly facing with respect to the first rim portion 14. Ultimately, the locking tabs 36 will biasingly register with the openings 40, such openings 40 are caused by the upsetting of the tabs 24.

The face 38 of the locking tabs 36 will lockingly engage the inwardly disposed periphery of the openings 40 in the first rim portion 14. As can be seen from the drawings, the stop tab 26 is centrally located with respect to the tabs 24. The base portion 32 of the spring retention clip 30 is provided with two axially projecting legs 42, the inwardly facing surfaces of which engage and extend beyond the centrally located stop tab 26. Accordingly, in its fully inserted state, the spring retention clip 30 is firmly, mechanically interlocked to the first rim portion 14 within the receptacles 22. The spring retention clip 30 wil be held firmly against the first rim portion 14 and will not move axially or radially even under significant dynamic forces encountered during operation of the vehicle with which the wheel 18 is associated. The spring retention clip 30 is further provided with a semi circular top portion 34.

The semi circular top portion 34 terminates in a reverse turned toothed portion 44, the teeth 46 of which may be formed in a pattern generally described in U.S. Pat. No. 3,567,286 to Gibbings. The semi circular top portion 34 basically acts as a biasing or spring member to biasingly force the teeth 46 of the toothed portion 44 into frictional engagement with the inner surface of the wheel flange 20 to, thereby, maintain the position of the wheel trim assembly 10 on the vehicle wheel 18. To achieve the desired spring and mechanical interlocking characteristics of the spring retention clip 30, the spring retention clip 30 may be manufactured from a suitable material such as annealed spring steel, SAE 1065, (MS 42), heat treated by hardening and tempering to a Rockwell hardness to approximately 48–50. The surface of the spring retention clip 30 may be treated with a 0.0002 cadmium plate which would suitably withstand the adverse environmental conditions experienced by a vehicle wheel. The spring retention clip 30 so manufactured would typically withstand a 96 hour salt spray test.

The wheel trim assembly 10 may be in the form of a wheel cover or trim ring as those terms are commonly defined and used in the trade. To that purpose, the annular ring 12 is provided with an outwardly facing radially projecting lip 48. The lip 48 will further enhance the structural integrity of the annular ring 12 and will provide the further purpose of effecting the means by which the trim ring or wheel cover may be fixedly attached to the annular ring 12. More particularly, the wheel cover or trim ring which are typically manufactured from stainless steel (both not shown) could be attached by the deforming of the outer annular portion of their material about the radially projecting lip 48 to mechanically interlock one to the other.

As can be seen from the above, the wheel trim assembly 10 utilizes different materials for its various component parts, thus achieving both efficiency in the manufacturing process as well as effective cost control with respect to material costs. As can be further seen from the above, the present invention utilizes a new, unique and advanced concept in attaching the spring retention clip 30 to the annular ring 12 without the use of complex rivets or welding techniques.

While it will be apparent that the invention herein disclosed is well calculated to achieve the benefits and advantages as hereinabove set forth, it will be appreciated that the invention is susceptible to modification, variation and change without departing from the spirit thereof.

I claim:

1. A wheel trim assembly for disposition on the axial outer face of a vehicle wheel having a wheel flange; said wheel trim assembly being of the type comprising an annular ring having a rim portion disposed in a plane substantially parallel to the plane of said wheel flange; said rim portion having formed on the outer surface thereof a plurality of receptacles each of which slidably receive a spring retention clip for mechanically interlocking said spring retention clip to said annular ring; said spring retention clip being engageable with said wheel flange for mounting said wheel trim assembly on said wheel; said receptacle including two opposed circumferentially facing tabs and an axial inwardly facing stop tab all formed by upsetting said tab material from said annular ring; said spring retention clip having an arcuate base portion whose arc corresponds generally to the arc of the outer surface of said annular ring; said base portion of said spring retention clip being received by said receptacle; said stop tab capturing said base portion of said spring retention clip along its radially inwardly facing end.

2. A wheel trim assembly in accordance with claim 1, wherein said axially inwardly facing stop tab is located centrally between said tabs and there are at least three receptacles each receiving a spring retention clip.

3. A wheel trim assembly in accordance with claim 1, wherein said spring retention clip is further provided with a semicircular top portion terminating in a reverse turned toothed portion frictionally engaging said wheel flange.

4. A wheel trim assembly in accordance with claim 1, wherein said spring retention clip is provided with at least one locking tab formed on said base portion for registration with the opening in said rim portion caused by the upsetting of said tab.

5. A wheel trim assembly in accordance with claim 4, wherein there are two said locking tabs one provided at each end of said base portion of said spring retention clip.

6. A wheel trim assembly in accordance with claim 5, wherein said spring retention clip is manufactured from spring steel and wherein said semi-circular top portion of said spring retention clip provides substantial biasing force to frictionally engage said toothed portion with said wheel flange.

7. A wheel trim assembly in accordance with claim 5, wherein said base portion of said spring retention clip is provided with two axially projecting legs the inner surfaces of which engage and extend beyond said stop tab.

8. A wheel trim assembly in accordance with claim 1, wherein said annular ring is manufactured from galvanized strip steel which is formed in a closed loop.

9. A wheel trim assembly in accordance with claim 1, wherein there are five receptacles each receiving one spring retention clip.

10. A wheel trim assembly in accordance with claim 1, wherein said rim portion of said annular ring is disposed slightly inwardly with respect to the plane of said wheel flange.

* * * * *